(12) United States Patent
Meisenzahl et al.

(10) Patent No.: US 9,302,686 B2
(45) Date of Patent: Apr. 5, 2016

(54) TRACK BRAKE FOR RAIL VEHICLES

(71) Applicant: SIEMENS AKTIENGESELLSCHAFT, Munich (DE)

(72) Inventors: Klaus Meisenzahl, Duisburg (DE); Holger Quast, Xanten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/350,197

(22) PCT Filed: Sep. 29, 2012

(86) PCT No.: PCT/EP2012/004118
§ 371 (c)(1),
(2) Date: Apr. 7, 2014

(87) PCT Pub. No.: WO2013/050132
PCT Pub. Date: Apr. 11, 2013

(65) Prior Publication Data
US 2014/0284149 A1   Sep. 25, 2014

(30) Foreign Application Priority Data
Oct. 7, 2011   (DE) .......................... 10 2011 115 089

(51) Int. Cl.
*B61K 7/02* (2006.01)
*B61H 11/00* (2006.01)
*B61K 7/04* (2006.01)
*F16D 65/04* (2006.01)

(52) U.S. Cl.
CPC ........ *B61H 11/00* (2013.01); *B61K 7/04* (2013.01); *F16D 65/04* (2013.01)

(58) Field of Classification Search
CPC combination set(s) only.
See application file for complete search history.

(56) References Cited

U.S. PATENT DOCUMENTS

| 1,239,448 | A | * | 9/1917 | Armbrust ...................... 188/255 |
| 3,684,062 | A | * | 8/1972 | Johnson .................... 188/251 R |
| 4,267,902 | A | * | 5/1981 | Schupbach et al. ............. 188/62 |
| 4,273,219 | A | * | 6/1981 | Ito ................................. 188/256 |
| 5,788,027 | A | * | 8/1998 | Shute et al. .............. 188/250 B |
| 6,364,072 | B1 | * | 4/2002 | Grupp et al. .................. 188/165 |
| 6,581,732 | B1 | * | 6/2003 | Shute et al. ................... 188/242 |

FOREIGN PATENT DOCUMENTS

| CH | 634514 | A5 | 2/1983 |
| DE | 3736580 | A1 | 5/1989 |
| DE | 3930332 | A1 | 3/1991 |
| DE | 102005054832 | B3 | 8/2007 |
| FR | 991609 | A | 10/1951 |
| GB | 1482999 | A | 8/1977 |

\* cited by examiner

*Primary Examiner* — Christopher Schwartz
(74) *Attorney, Agent, or Firm* — Laurence Greenberg; Werner Stemer; Ralph Locher

(57) ABSTRACT

A track brake for a rail vehicle has a plurality of elongated brake shoes affixed at intervals one behind the other to a continuous brake beam. The brake shoes have inserts incorporated in recesses inside their braking surfaces. The inserts are made of a friction-generating material that is resistant to temperatures under the braking load.

6 Claims, 2 Drawing Sheets

TRACK BRAKE FOR RAIL VEHICLES

BACKGROUND OF THE INVENTION

Field of the Invention

The invention relates to a track brake for rail vehicles, which includes a plurality of brake shoes affixed onto a continuous brake beam and spaced apart longitudinally one behind the other.

A track brake of this type is known, for example, from GB 1482999. It comprises a plurality of elongated brake shoes, affixed onto a continuous brake beam and spaced apart one behind another, which are short in length compared to the length of the brake beam and where the brake shoes are bolted to the brake beam by means of a vibration-damping intermediate shim.

CH 634514 discloses how brake shoes can be constructed for the purpose of noise reduction as sandwiched segments, whereby an intermediate shim made of another material, for example of non-ferrous metal, sintered metal or a ceramic, is provided between an upper part and a lower part made of steel.

DE 10 2005 054 832 B3 describes brake shoes, affixed one behind another in the longitudinal direction of the brake beam, with braking surfaces which are arranged at different heights for improved sound damping.

DE 39 30 332 A1 describes brake beams having chambers which are open at their sides, in which are accommodated brake shoes in the form of projecting wearing elements made of a material which dampens the brake noise. Each of the wearing elements is accommodated in pockets made of a vibration damping material, and is fixed in them by means of bolts.

BRIEF SUMMARY OF THE INVENTION

In contrast, the objective of the present invention is to achieve in another way a considerable reduction of the brake noise, caused by vibrations during a braking operation, while at the same time making possible an increase in the coefficient of friction and hence improved braking performance.

This objective is achieved by a track brakeas claimed.

Here, an important consideration in the solution relates to the choice of material for the brake shoes, which can consist of steel or cast iron with a spheroidal graphite structure, and of a special material for the inserts introduced into said brake shoes, which when subject to the braking load is thermally stable and produces abraded matter. The vibration of the rail wheel is damped in addition by the abraded matter, which is present in powder form as fine abraded particles, so that the very disruptive high-frequency screeching noises, in particular, are minimized. The abraded matter produced on the braking surface of the brake shoes while they are being pressed against the applicable face of the rail wheel during braking additionally results in an increase in the coefficient of friction for this braking operation, with the associated effect of an increase in the braking performance in the case of the inventive track brake.

Because the brake shoes are affixed in brake beams, which can be exchanged in the known manner, the replacement of brake shoes which are worn down does not take much time.

In accordance with one particular embodiment of the present invention, which provides that the inserts are arranged with height offsets relative to one another at right angles to the longitudinal direction of the brake beam, the noise damping is yet further improved, because this counteracts even more effectively the vibrations of the rail wheels in the plane of the wheel. This also ensures a uniformly good supply of abraded material to the braking surfaces.

In accordance with another variant, it is inventively proposed that the inserts are arranged with regular height offsets, e.g. in an undulating or serpentine form. A distribution in a wavy form, e.g. in the nature of a typical sine wave, has here led to particularly advantageous results in practice.

An embodiment of the invention which is particularly suitable in practice is if the inserts consist of a sintered ceramic, in which case they can advantageously be processed in the form of cylindrical pins. However, suitable inserts can also be in other shapes.

For the purpose of affixing said inserts, provision is made in accordance with the invention that the inserts are solid bodies which are pressed into blind holes, or depressions of a similar type, within the braking surface.

For one practical exemplary embodiment, good results were achieved for the sound damping by means of brake beams of up to 10 m in length with a length of brake shoe of between 0.4 and 1.5 m. In this case, inserts made of a sintered ceramic in the form of cylindrical pins with a diameter range of up to 26 mm were pressed into the brake shoes.

BRIEF DESCRIPTION OF THE SEVERAL VIEWS OF THE DRAWING

An exemplary embodiment of the invention is explained below by reference to the drawing, in which.

DESCRIPTION OF THE INVENTION

Figure 1:
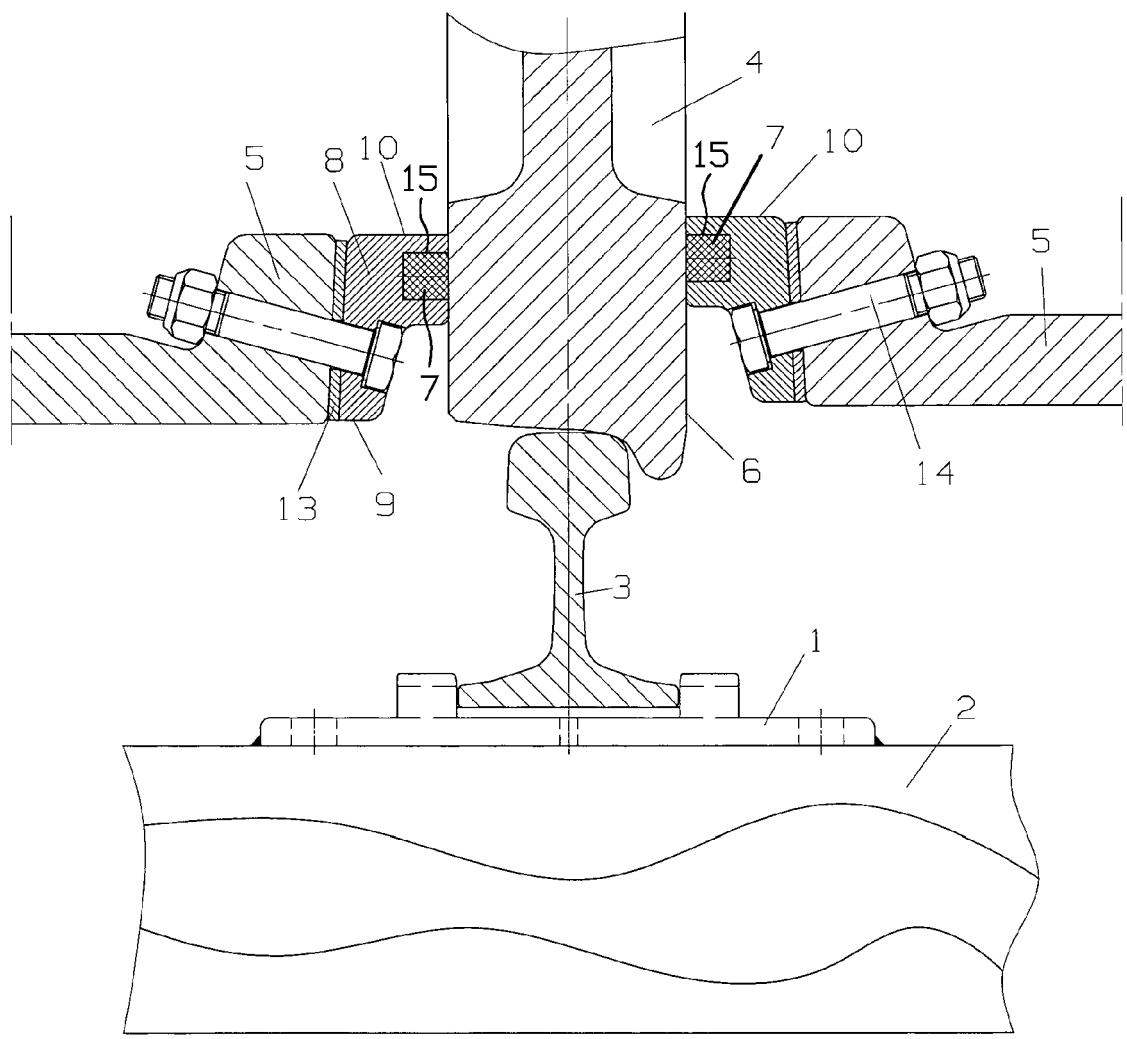
FIG. 1 shows a track brake with brake beams arranged on both sides of the rail wheel, as a vertical section through the rail.

As shown in FIG. 1, a rail 3 is affixed onto a track sleeper 1 of a track bed 2. On the rail 3 runs a rail wheel 4, against the face 6 of which is pressed a brake beam 5 of a track brake. The means of applying the pressure, which could be mechanical spring assemblies, hydraulically or pneumatically actuated cylinders or the like, are not shown in the drawing.

Brake shoes 10 are attached, by means of threaded bolts 14 so that they can be exchanged, to a brake beam 5 on the side of it which faces the rail wheel, with an intermediate shim 13 made of a vibration damping material being inserted between the brake shoes 10 and the facing side of the brake beam 5.

Each of the brake shoes 10 is a forged shaped body made of steel or a cast body, with a base piece 9 which serves to attach it, and a collar-piece 8 formed at the top of it into which are pressed inserts in the form of cylindrical pins 7 made of a sintered ceramic. The inserts 7 are pressed into depressions 15.

Figure 2:
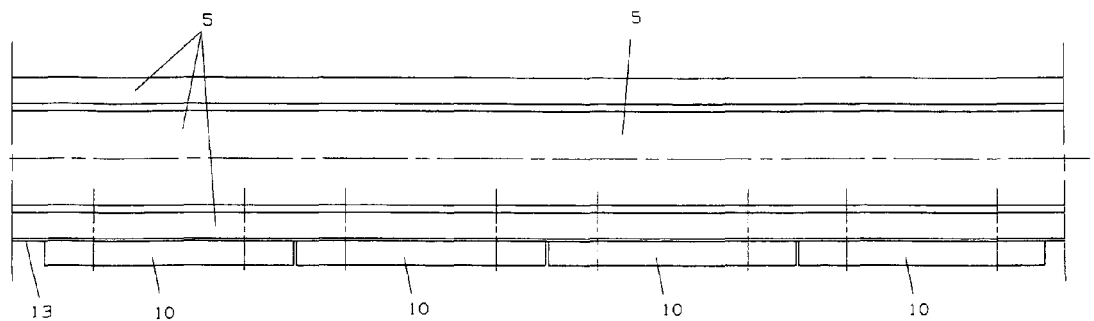
FIG. 2 shows a plan view of the section of a brake beam and FIG. 3 shows a brake beam, seen as a side view onto the braking surface.

FIG. 2 shows a plan view of a longitudinal section of a brake beam 5, with four brake shoes 10 arranged one behind the other, which are bolted to the brake beam 5 through the intermediate shim 13 made of vibration damping material.

Figure 3:
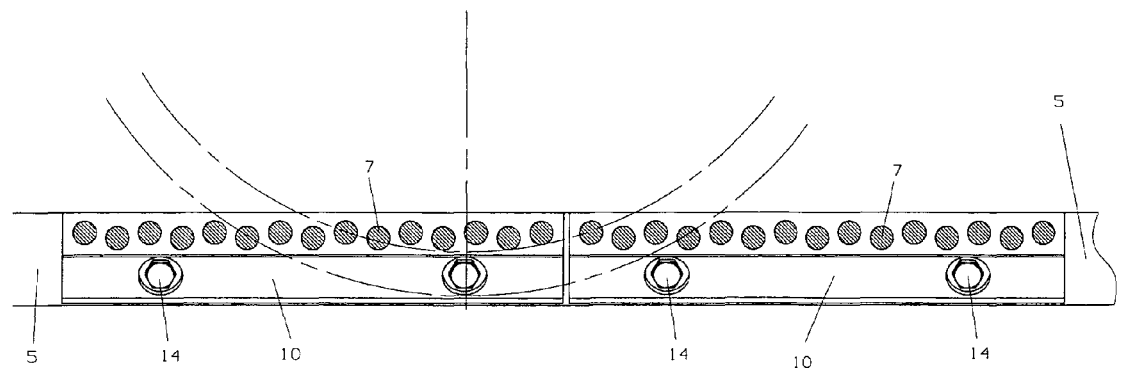

FIG. 3 shows an enlarged side view of a section of a brake beam 5 with two brake shoes 10 affixed one behind the other by means of threaded bolts 14, looking towards its brake surface. This is made up of the matrix material, e.g. in the form of a cast body made of spheroidal graphite, with cylindrical pins 7 of a sintered ceramic pressed into it.

The pins 7 are arranged with a height offset relative to one other, so that their center points describe a planar undulating form.

The invention claimed is:

1. A track brake for a rail vehicle, comprising:
   a continuous brake beam;
   a plurality of elongated brake shoes affixed on said continuous brake beam and spaced apart one behind another, said brake shoes having a brake surface formed with depressions;
   inserts disposed in said depressions within said brake surfaces of said brake shoes, said inserts being arranged with height level offsets relative to one another perpendicular to a longitudinal direction of said brake beam, and said inserts being formed of a material that, under a braking load for braking the rail vehicle, is thermally stable and produces abraded matter.

2. The track brake according to claim 1, wherein said height level offsets between said inserts are regular height offsets.

3. The track brake according to claim 2, wherein said inserts are arranged in an undulating or serpentine form along the longitudinal direction of said brake beam.

4. The track brake according to claim 1, wherein said inserts consist of a sintered ceramic.

5. The track brake according to claim 1, wherein said inserts are solid bodies pressed into said depressions accommodating them.

6. The track brake according to claim 1, wherein said inserts consist of cylindrical pins pressed into blind bores formed into said braking surface.

* * * * *